US007834314B2

(12) United States Patent
Wagner et al.

(10) Patent No.: US 7,834,314 B2
(45) Date of Patent: Nov. 16, 2010

(54) ION DETECTION USING A PILLAR CHIP

(75) Inventors: Peter Wagner, Belmont, CA (US); Mark A. Scalf, Madison, WI (US); Frank Zaugg, Belmont, CA (US)

(73) Assignee: Zyomyx, Inc., Hayward, CA (US)

( * ) Notice: Subject to any disclaimer, the term of this patent is extended or adjusted under 35 U.S.C. 154(b) by 0 days.

(21) Appl. No.: 12/082,149

(22) Filed: Apr. 8, 2008

(65) Prior Publication Data

US 2008/0203291 A1 Aug. 28, 2008

Related U.S. Application Data

(63) Continuation of application No. 10/570,716, filed as application No. PCT/US2004/028622 on Sep. 1, 2004, now abandoned.

(60) Provisional application No. 60/500,313, filed on Sep. 3, 2003.

(51) Int. Cl.
*H01J 49/00* (2006.01)
*C02F 1/40* (2006.01)
*B01L 3/00* (2006.01)

(52) U.S. Cl. ....................... 250/284; 250/281; 250/282; 250/288; 436/43; 436/48; 436/94; 204/601; 204/604

(58) Field of Classification Search ....................... None
See application file for complete search history.

(56) References Cited

U.S. PATENT DOCUMENTS

| | | | | |
|---|---|---|---|---|
| 6,175,112 | B1 * | 1/2001 | Karger et al. | 250/288 |
| 6,399,177 | B1 * | 6/2002 | Fonash et al. | 428/119 |
| 6,454,924 | B2 * | 9/2002 | Jedrzejewski et al. | 204/601 |
| 6,699,719 | B2 | 3/2004 | Yamazaki et al. | |
| 6,794,196 | B2 * | 9/2004 | Fonash et al. | 436/174 |

* cited by examiner

*Primary Examiner*—David A Vanore
(74) *Attorney, Agent, or Firm*—Townsend and Townsend and Crew LLP

(57) ABSTRACT

Methods and assemblies for ion detection in samples using a chip with elevated sample zones, also known as a “pillar chip.” Methods include analyzing such a sample by desorbing a sample from a chip, producing a described ion sample and detecting the same. The chip comprises a base having a surface and one or more structures protruding above the surface of the base. Each structure comprises a pillar and a sample zone, the latter containing a support material and the sample to be analyzed. Assemblies include a chip such as that described above and a conductive element that comprises an aperture of sufficient proportion to allow passage of a molecular ion and that is adapted to be at a different electrical potential than the base of the chip.

14 Claims, 10 Drawing Sheets

ION DETECTION USING A PILLAR CHIP

BACKGROUND OF THE INVENTION

In the discovery of new drugs, potential drug candidates are generated by identifying chemical compounds with desirable properties. These compounds are sometimes referred to as "lead compounds". Once a lead compound is discovered, variants of the lead compound can be created and evaluated as potential drug candidates.

In order to reduce the time associated with discovering useful drug candidates, high throughput screening (HTS) methods are replacing conventional lead compound identification methods. High throughput screening methods use libraries containing large numbers of potentially desirable compounds. The compounds in the library are numerous and may be made by combinatorial chemistry processes. In a HTS process, the compounds are screened in one or more assays to identify those library members (particular chemical species or subclasses) that display a desired characteristic activity. The compounds thus identified can serve as conventional "lead compounds" or they can be therapeutic.

Conventional HTS processes use multi-well plates having many wells. For example, a typical multi-well plate may have 96 wells. Each of the wells may contain a different liquid sample to be analyzed. Using a multi-well plate, a number of different liquid samples may be analyzed substantially simultaneously.

It is desirable to reduce the volume of the wells in a multi-well plate to increase the density of the wells on the plate. By doing so, more wells can be present on the plate and more reactions can be analyzed substantially simultaneously. Also, as the volumes of the wells are reduced, the liquid sample volumes are reduced. Reducing the liquid sample volumes reduces the amount of reagents needed in the HTS process. By reducing the amount of reagents used, the costs of the HTS process can be reduced. Also, liquid samples such as samples of biological fluids (e.g., blood) are not always easy to obtain. It is desirable to minimize the amount of sample in an assay in the event that little sample is available.

While it is desirable to increase the density of the wells in a multi-well plate, the density of the wells is limited by the presence of the rims on the wells. The rims could be removed to permit the sample zones to be closer together and thus increase the density of the sample zones. However, by removing the rims, no physical barrier would be present between adjacent sample zones. This increases the likelihood that liquid samples on adjacent sample zones could intermix and contaminate each other.

Also, reducing the liquid sample volumes can be problematic. Decreasing the size of assays to volumes smaller than 1 microliter substantially increases the surface-to-volume ratio. Increasing the surface-to-volume ratio increases the likelihood that analytes or capture agents in the liquid sample will be altered, thus affecting any analysis or reaction using the analyte or capture agents. For example, proteins in a liquid sample are prone to denature at liquid/solid and liquid/air interfaces. When a liquid sample containing proteins is formed into a droplet, the droplet can have a high surface area relative to the amount of proteins in the droplet. If the proteins in the liquid sample come into contact with the liquid/air interface, the proteins may denature and become inactive. Furthermore, when the surface-to-volume ratio of a liquid sample increases, the likelihood that the liquid sample will evaporate also increases. Liquids with submicroliter volumes tend to evaporate rapidly when in contact with air. For example, many submicroliter volumes of liquid can evaporate within seconds to a few minutes. This makes it difficult to analyze or process such liquids. In addition, if the liquid samples contain proteins, the evaporation of the liquid components of the liquid samples can adversely affect (e.g., denature) the proteins.

Chips having elevated sample zones solve many of the problems associated with the use of multi-well plated for HTS processes (see U.S. patent application Ser. No. 09/792,335, filed Feb. 23, 2001, entitled "Chips Having Elevated Sample Surfaces").

The identification of library members in HTS requires a fast and efficient method of analysis. The paucity of efficient library compound identification techniques remains a serious limitation for routine use of HTS processes such as protein analysis. Mass spectrometry is one such technique that can potentially be used for various HTS processes such as protein analysis. Mass spectrometry combines high sensitivity, selectivity and specificity with speed of analysis. For example, a complete mass spectrum can be recorded on a microsecond timescale.

Thus, there is a need in the art to adapt highly sensitive mass spectrometry techniques to high throughput screening methodologies such as protein analysis. Embodiments of the invention address, for example, these and other problems.

BRIEF SUMMARY OF THE INVENTION

Embodiments of the invention provide methods and assemblies for ion detection of samples using a chip with elevated sample zones. The elevated sample zones provide a number of ion detection advantages over chips with non-elevated sample zones, such as improved desorption and ionization of samples, a decrease in desorption of contaminants from non-sample areas, and improved electric field configurations. Embodiments of the invention have a number of applications in drug discovery, environmental analyses for tracking and the identification of contaminants, target discovery and/or validation as well as in diagnostics in a clinical setting for staging or disease progression. In addition, the invention may also be used with research and clinical microarray systems and devices.

One embodiment is directed to a method of analyzing a sample comprising desorbing a sample from a chip to produce a desorbed ion sample and detecting the desorbed ion sample. The chip comprises a base having a surface and one or more structures protruding above the surface of the base. Each structure comprises a pillar and a sample zone. The sample zone comprises a support material and the same to be analyzed.

Another embodiment is directed to an analytical assembly a chip and a conductive element. The chip comprises a base having a surface and one or more structures protruding above the surface of the base. Each structure comprises a pillar and a sample zone. The addition, the sample zone comprises a support material. The conductive element comprises an aperture of sufficient proportion to allow passage of a molecular ion and is adapted to be at a different electrical potential than the base.

Another embodiment is directed to a mass spectrometer apparatus comprising an analytical assembly, an ionization source to ionize the sample, and an ion detector for detecting an ion desorbed from the sample zone. The analytical assembly comprises a chip and a conductive element. The chip comprises a base having a surface and one or more structures protruding above the surface of the base. Each structure comprises a pillar and a sample zone. The addition, the sample zone comprises a support material. The conductive element comprises an aperture of sufficient proportion to allow passage of a molecular ion and is adapted to be at a different electrical potential than the base.

These and other embodiments are described on further detail below.

DETAILED DESCRIPTION OF THE INVENTION

Embodiments of the invention may be used in any number of different fields. For example, embodiments of the invention may be used in pharmaceutical applications such as proteomic (or the like) studies for target discovery and/or validation as well as in diagnostics in a clinical setting for staging or disease progression. Also, embodiments of the invention may be used in environmental analyses for tracking and the identification of contaminants. In academic research environments, embodiments of the invention may be used in biological or medical research. Embodiments of the invention may also be used with research and clinical microarray systems and devices.

In embodiments of the invention, events such as binding, binding inhibition, reacting, or catalysis between two or more components can be analyzed. For example, the interaction between an analyte in a liquid sample and a binding agent bound to a sample zone on a pillar may be analyzed using embodiments of the invention. More specifically, interactions between the following components may be analyzed using embodiments of the invention: antibody/antigen, antibody/hapten, enzyme/substrate, carrier protein/substrate, lectin/carbohydrate, receptor/hormone, receptor/effector, protein/DNA, protein/RNA, repressor/inducer, DNA/DNA and the like.

In one embodiment, the present invention provides a method of analyzing a sample comprising desorbing a sample from a chip to produce a desorbed ion sample and detecting the desorbed ion sample. The chip comprises a base having a surface and one or more structures protruding above the surface of the base. Each structure comprises a pillar and a sample zone. The sample zone comprises a support material and the sample to be analyzed. Once the desorbed ion sample is detected, it can be analyzed to determine its physical properties, chemical properties, quantity, etc.

In another embodiment, the present invention provides an analytical assembly comprising a chip and a conductive element. The chip comprises a base having a surface and one or more structures protruding above the surface of the base. Each structure comprises a pillar and a sample zone. In addition, the sample zone comprises a support material. The conductive element comprises an aperture of sufficient proportion to allow passage of a molecular ion and is adapted to be at a different electrical potential than the base.

Figure 1:
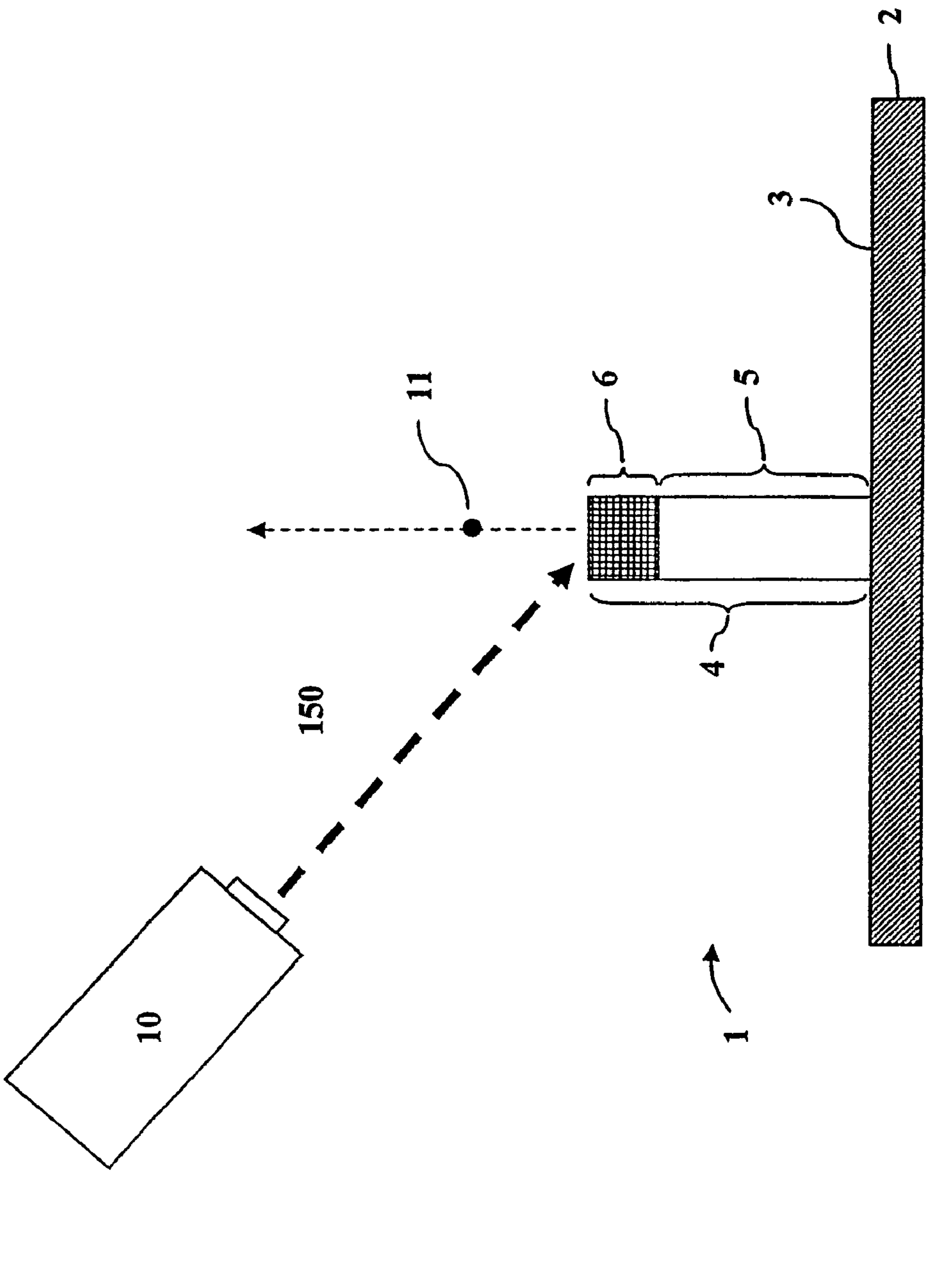
FIG. 1 illustrates laser desorption of a sample from the sample zone

In an exemplary embodiment, desorption of the sample is accomplished by directing radiation to the sample zone. Typically, a laser desorption technique is used wherein the desorbing radiation is pulsed laser radiation. FIG. 1 illustrates an exemplary laser desorption technique. The laser radiation source 10 directs radiation 150 to the sample zone 6 resulting in desorption of the sample from the sample zone to from a desorbed ion sample 11.

The Chip

The chip comprises a base including a base surface and one or more structures comprising a pillar and a sample zone. The one or more structures are typically in an array on the base of the chip. Each structure includes a sample zone that is elevated with respect to the base of the chip.

In an exemplary embodiment, the structures are arranged in an array format. Structure arrays of the current invention may be regular or irregular. For example, the array may have even rows of structures forming a regular array of pillars. The density of the structures in the array may vary. For example, the density of the structures may be about 25 pillars per square centimeter or greater (e.g., 10,000 or 100,000 per $cm^2$ or greater). Although the chips may have any suitable number of structures, in some embodiments, the number of structures per chip may be greater than 10, 100, or 1000. The structures pitch (i.e., the center-to-center distance between adjacent structures) may be 500 micrometers or less (e.g., 150 micrometers).

Each sample zone may be adapted to receive a sample to be processed or analyzed while the sample is in the sample zone. The sample may be or include a component that is to be bound, adsorbed, absorbed, reacted, etc. within the sample zone. For example, the sample can be a liquid containing analytes and a liquid medium. In another example, the sample may be the analytes themselves. Because a number of sample zones are on each chip, many samples may be processed or analyzed in parallel in embodiments of the invention.

Adjacent sample zones are separated by a depression that is formed by adjacent pillars and the base surface. In some embodiments, the pillars may have one or more channels that surround, wholly or in part, one or more pillars on the base. Examples of such channels are discussed in U.S. patent application Ser. No. 09/353,554 which is assigned to the same assignee as the present application and which is herein incorporated by reference in its entirety for all purposes.

Elevating the sample zone with the pillar with respect to the chip base provides a number of advantages. For example, by elevating the sample zone, potential liquid cross-contamination between the liquid samples on adjacent structures is minimized. A liquid sample within a sample zone does not easily flow to an adjacent sample zone because the sample zones are separated by a depression. In some embodiments, cross-contamination between samples on adjacent sample zones is reduced even though rims are not present to confine a liquid sample to a sample zone. Since rims need not be present to confine the samples to their respective sample zones, the spacing between adjacent sample zones can be reduced, thus increasing the density of the sample zones. As a result, more liquid samples may be processed and/or analyzed per chip than in conventional methods. In addition, small liquid sample volumes can be used in embodiments of the invention so that the amount of reagents used is also decreased, thus resulting in lower costs.

Figure 2:
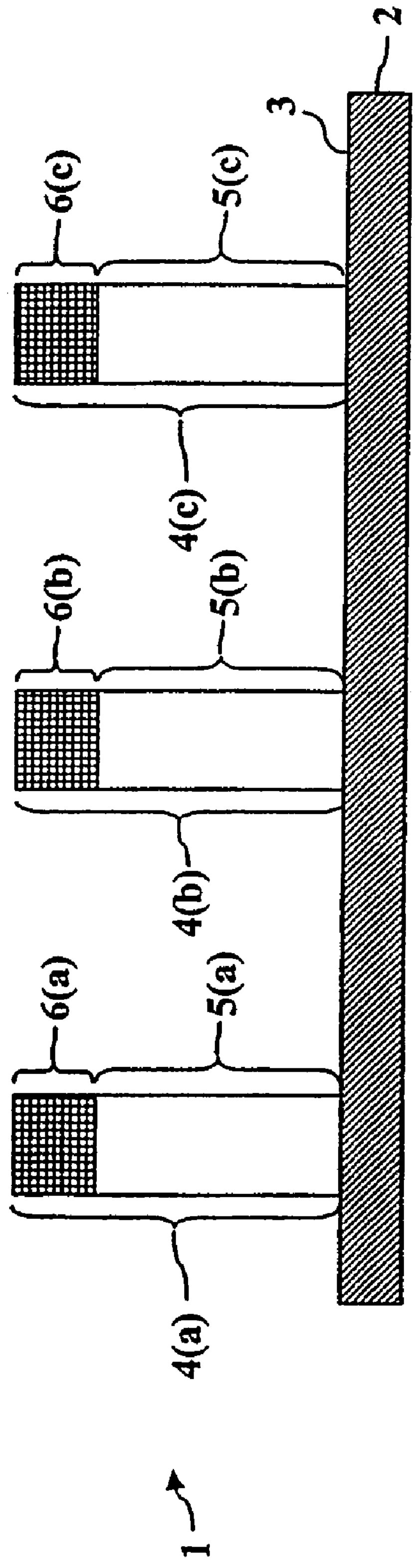
FIG. 2 illustrates a cross-sectional view of an exemplary chip.

FIG. 2 illustrates an exemplary embodiment of a chip 1. The chip 1 in FIG. 2 comprises a base 2 and a surface of the base 3. The chip 1 has three structures 4(*a*), 4(*b*), 4(*c*). The structures 4(*a*), 4(*b*), 4(*c*) protrude above the surface of the base 2. Each structure 4(*a*), 4(*b*), 4(*c*) comprises a pillar 5(*a*), 5(*b*), 5(*c*) and a sample zone 6(*a*), 6(*b*), 6(*c*). Only three structures are shown for ease of illustration. Other chip embodiments could have tens or hundreds of such structures.

Each of the structures may be oriented substantially perpendicular with respect to the base 2. Each of the structures 4(*a*)-4(*c*) include a side surface. The side surfaces of the structures 4(*a*)-4(*c*) can define respective sample zones 6(*a*)-6(*c*). The sample zones 6(*a*)-6(*c*) may coincide with the top portions of the pillars 5(*a*)-5(*c*) and are elevated with respect to the base surface 3 of the chip 1. The base surface 3 and the sample zones 6(*a*)-6(*c*) may have the same or different coatings or properties.

Each sample zone comprises a support material and a sample. As used herein, a "sample zone" refers to a zone of a structure that includes a sample. A sample zone may or may not include a support material. For example, in one embodiment, the sample zone may include only a sample (e.g., proteins in a liquid medium) on top of a solid layer of support material on a pillar. In another embodiment, the sample zone may include a sample that is impregnated in a porous support material. The porous support material may be separate and distinct from the pillar or may be integral with the pillar. For instance, in the latter case, the entire pillar may be a porous material and the sample may only impregnate the top portion of the porous pillar.

As used herein, a "support material" is a material that supports a sample. The support material can be porous or solid.

Figure 3A:
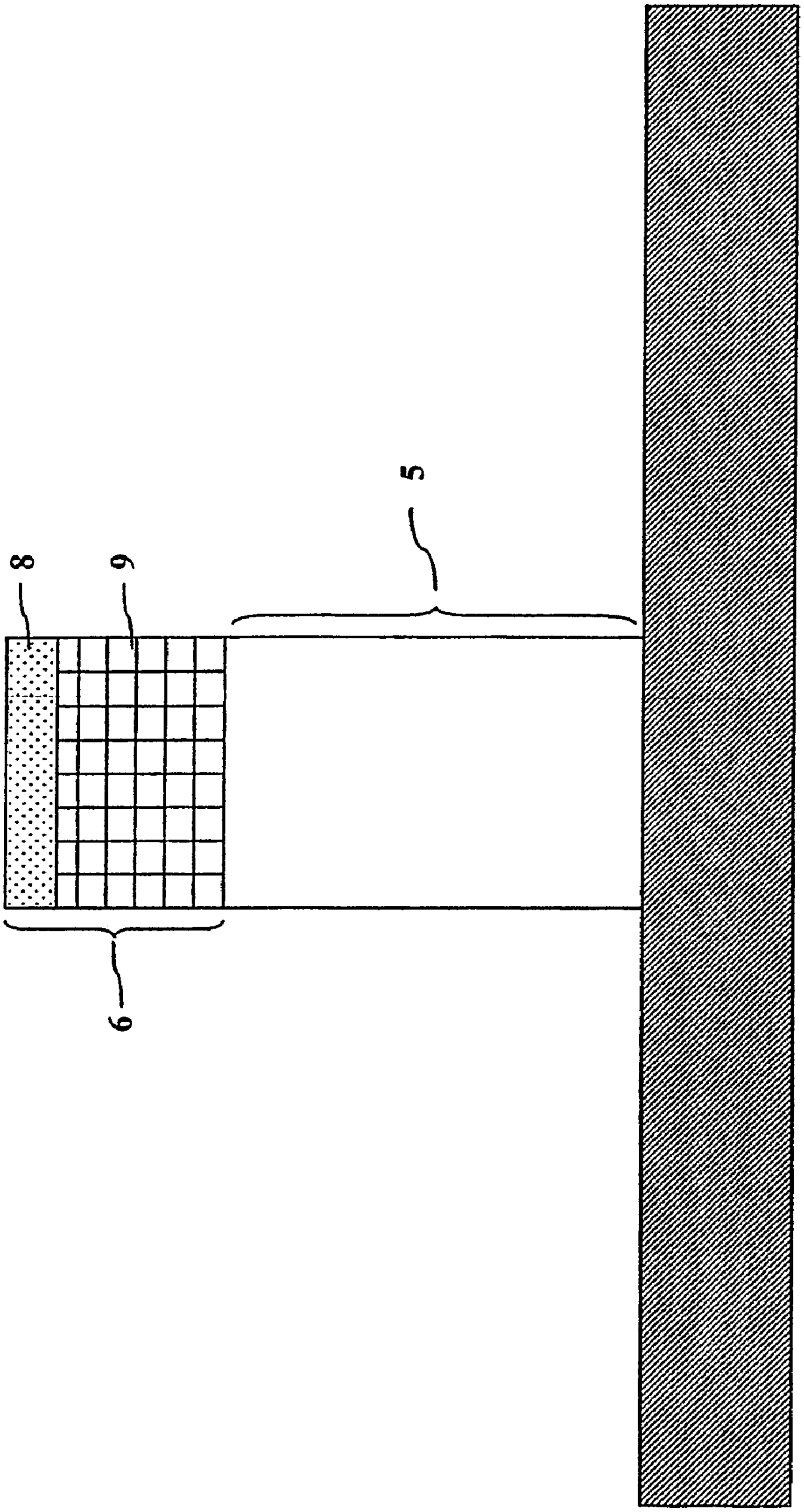
FIGS. 3(*a*)-3(*b*) illustrates cross sectional views of exemplary sample zones.
Figure 3B:
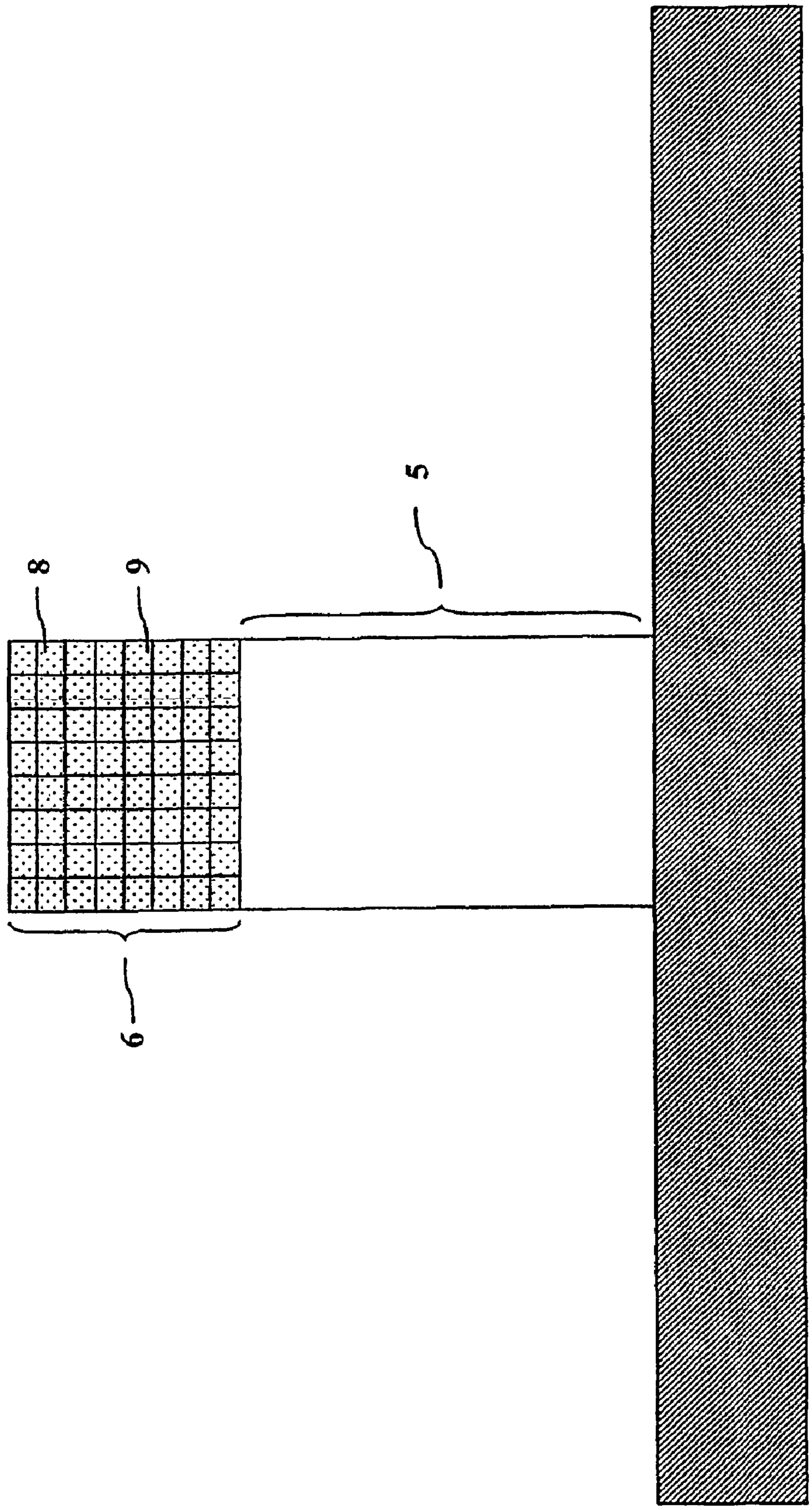

FIG. 3(*a*) illustrates an exemplary embodiment of the sample zone 6 comprising a sample 8 positioned above the support material 9. In this example, the support material can be a portion of the pillar 5 or can be one or more layers on the pillar 5.

FIG. 3(*b*) illustrates another exemplary embodiment, wherein the sample 8 is present throughout the support material 9. Typically, where the sample is present throughout the support material, the support material is porous.

The sample zones may have any suitable geometry. The geometry of the sample zone may be the same or different than the pillar of the structure. For example, the sample zone may be circular while the pillar is square or octahedral. Each sample zone may have any suitable width including a width of less than about 0.5 mm (e.g., 100 micrometers or less). The height of the sample zone may be greater than 100 micrometers or less than about 10 nanometers.

The sample zone may include one or more layers of material and/or support material. In some embodiments, the sample zone may be inherently hydrophilic or rendered hydrophilic, which are less likely to adversely affect proteins that may be at the top regions of the structures.

In some embodiment, the sample zone may comprises a first layer and a second layer, wherein the second layer is on top of the first layer. The first and/or the second layer may comprise the sample. The first and the second layers may comprise any suitable material having any suitable thickness. The first and the second layers can comprise inorganic materials and may comprise at least one of a metal or an oxide such as a metal oxide. The selection of the material used in, for example, the second layer (or for any other layer or at the top of the pillar) may depend on the molecules that are to be bound to the second layer. For example, metals such as platinum, gold, and silver may be suitable for use with linking agents such as sulfur containing linking agents (e.g., alkanethiols or disulfide linking agents), while oxides such as silicon oxide or titanium oxide are suitable for use with linking agents such as silane-based linking agents. The linking agents can be used to couple entities such as binding agents to the pillars.

Illustratively, the first layer may comprise an adhesion metal such as titanium and may be less than about 5 nanometers thick. The second layer 29 may comprise a noble metal such as gold and may be about 100 to about 200 nanometers thick. In another embodiment the first layer 26 may comprise an oxide such as silicon oxide or titanium oxide, while the second layer 29 may comprise a metal (e.g., noble metals) such as gold or silver. The sample zone may have more or less then two layers (e.g., one layer) on them. Moreover, although the first and the second layers are described as having specific materials, it is understood that the first and the second layers may have any suitable combination of materials.

The layers in the sample zone may be deposited using any suitable process. For example, the previously described layers may be deposited using processes such as electron beam or thermal beam evaporation, chemical vapor deposition, sputtering, or any other technique known in the art.

In some embodiments, the side or portion of the side surfaces of the pillars may be provided with the same selected properties as the sample zone, or different selected properties from the sample zone. In one exemplary embodiment, the side surfaces of a pillar of a chip comprises the support material of the sample zone. In another exemplary embodiment, side surfaces of a pillar of a chip is rendered hydrophobic while the sample zone of the pillar is hydrophilic. The hydrophilic sample zone of a pillar attracts the liquid samples, while the hydrophobic side surfaces of the pillar inhibit the liquid samples from flowing down the sides of the pillars. Accordingly, in some embodiments, a liquid sample may be confined to the sample zone of a pillar without a well rim. Consequently, in embodiments of the invention, cross-contamination between adjacent sample zones may be minimized while increasing the density of the sample zones.

The base of the chip may have any suitable characteristics. For instance, the base of the chip can have any suitable lateral dimensions. For example, in some embodiments, the base can have lateral dimensions less than about 2 square inches. In other embodiments, the base can have lateral dimensions greater than 2 square inches. The base surface may be generally planar. However, in some embodiments, the base may have a non planar surface. For example, the base may have one or more troughs. The structures containing the sample zones and the pillars may be in the trough. Any suitable material may be used in the base. Suitable materials include glass, silicon, or polymeric materials. Preferably, the base comprises a micromachinable material such as silicon.

The pillars may have any suitable geometry. For example, the cross-sections (e.g., along a radius or width) of the pillars may be circular or polygonal. Each of the pillars may also be elongated. While the degree of elongation may vary, in some embodiments the pillars may have an aspect ratio of greater than about 0.25 or more (e.g., 0.25 to 40). In other embodiments, the aspect ratio of the pillars may be about 1.0 or more. The aspect ratio may be defined as the ratio of the height H of each pillar to the smallest width W of the pillar. Preferably, the height of each pillar may be greater than about 1 micron. For example, the height of each pillar may range from about 1 to 10 micrometers, or from about 10 to about 200 micrometers. Each pillar may have any suitable width including a width of less than about 0.5 mm (e.g., 100 micrometers or less). A variety of shapes and sizes of structures and pillars are useful in the current invention. Structure and pillar sizes and shapes are described in U.S. patent application Ser. No. 09/792,335, U.S. patent application Ser. No. 10/208,381, U.S. Patent Application No. 60/184,381, U.S. Patent Application No. 60/225,999, and U.S. Pat. No. 6,454,924, which is assigned to the same assignee as the present application and which is herein incorporated by reference in its entirety for all purposes.

The pillars of the chip may be fabricated in any suitable manner and using any suitable material. For example, an embossing, etching or a molding process may be used to form the pillars on the base of the chip. For example, a silicon substrate can be patterned with photoresist where the top surfaces of the pillars are to be formed. An etching process such as a deep reactive ion etch may then be performed to etch deep profiles in the silicon substrate and to form a plurality of pillars. Side profiles of the pillars may be modified by adjusting process parameters such as the ion energy used in a reactive ion etch process. If desired, the side surfaces of the formed pillars may be coated with material such as a hydrophobic material while the top surfaces of the pillars are covered with photoresist. After coating, the photoresist may be removed from the top surfaces of the pillars. Other processes for fabricating pillars known in the semiconductor and MEMS (microelectromechanical systems) industries are also useful in the present invention.

Desorption and Ionization

The method of the present aspect involves desorbing the sample from the sample zone to produce a desorbed ion sample. Desorption is the process of removing the sample from the sample zone. To produce a desorbed ion sample, the sample is desorbed and ionized.

In an exemplary embodiment, desorption of the sample is accomplished by directing radiation to the sample zone. Typically, a laser desorption technique is used wherein the desorbing radiation is pulsed laser radiation. FIG. 3(*a*) illustrates an exemplary laser desorption technique. The laser radiation source 10 directs radiation 150 to the sample zone 6 resulting in desorption of the sample from the sample zone to from a desorbed ion sample 11.

Figure 4:
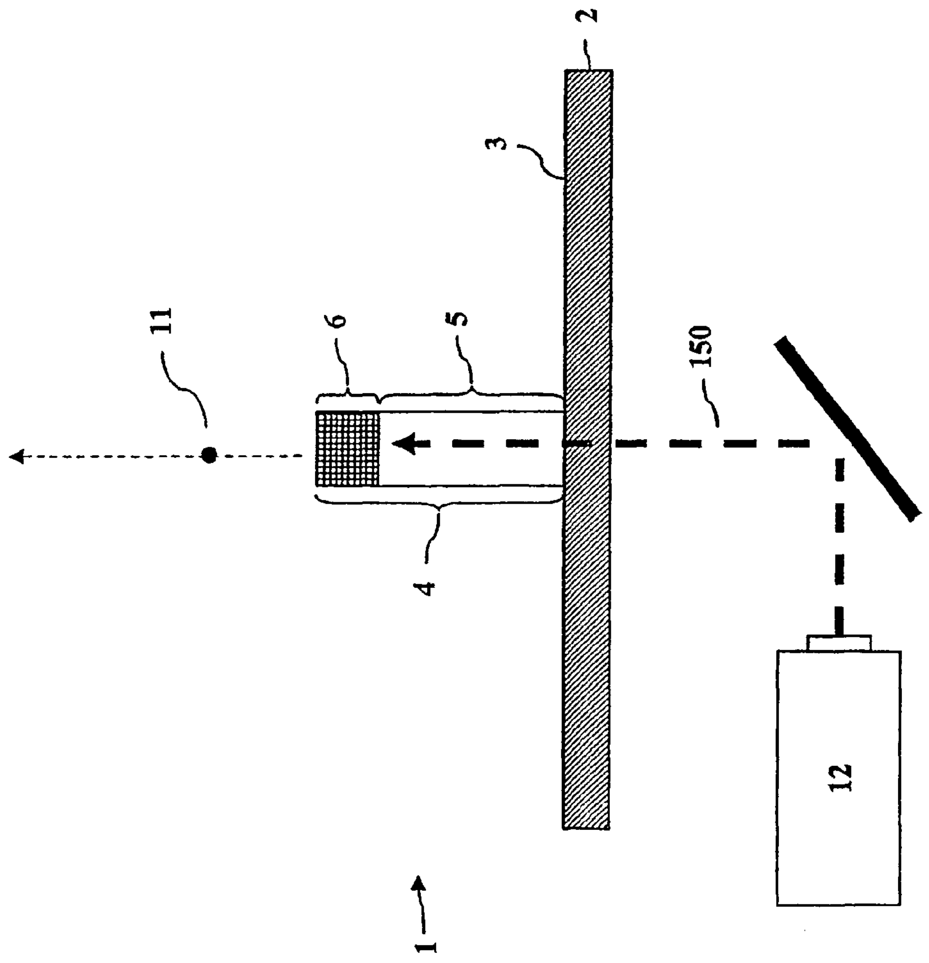
FIG. 4 illustrates an exemplary laser desorption of a sample from the sample zone through the pillar.

In another exemplary embodiment, the laser radiation 150 is directed to a sample zone from below the chip through the pillar 5 (see FIG. 4). In this embodiment, the pillar is typically comprised of materials that absorb little or no light radiation.

In another embodiment, the laser desorption technique is a matrix assisted laser desorption technique (MALDI). In this MALDI embodiment, the laser is directed to the support material 7 within the sample zone 6. The support material typically comprises a chemical matrix in the MALDI embodiment. Without being limited by any particular theory, the chemical matrix absorbs the laser light energy and produces a plasma that results in desorption and ionization of the sample (see Barber et al., *Nature* 293: 270-275 (1981); Karas et al., *Anal. Chem.* 60: 2299-2301 (1988); Macfarlane et al., *Science* 191: 920-925 (1976); Hillenkamp et al., *Anal. Chem.* 63: A1193-A1202 (1991)). Thus, in another embodiment, the support material is capable of transferring energy to the sample after receiving radiation.

In one embodiment, the sample zone comprises a support material that receives radiation. In another embodiment, the pillar and/or the base additionally comprise a support material that receives radiation.

In another embodiment, the support material is porous. Typically, the porous support material comprises a chemical matrix. In another embodiment, the support material is conducting or semiconducting. A variety of chemical matrices are useful in the present invention. Chemical matrices should be capable of transferring energy to the sample after receiving laser radiation. Suitable chemical matrices include porous silicon matrices. See Amato et al., *Optoelectronic Properties of Semiconductors and Superlattices,* 3-52 (1997). Porous silicon surfaces are strong absorbers of ultraviolet radiation. The preparation and photoluminescent nature of porous silicon surfaces is described by Cullis et al., *Appl. Phys. Lett.* 82: 909, 911-912 (1997). Cullis et al, also describe and review other photoluminescent porous semiconductors suitable for the approach described herein that exhibit the necessary strong absorption, including SiC, GaP, $Si_{1-x}$ $Ge_x$, Ge, and GaAs, and also InP that exhibits weak photoluminescence. Porosity properties, preparation, and modification of porous silicon surfaces for use in MALDI is desorbed in U.S. Pat. No. 6,288,390, which is herein incorporated by reference.

Other useful matrices include SiC, GaP, $Si_{1-x}$, $Ge_x$, Ge, GaAs, InP (see Cullis et al., *Appl. Phys. Lett.* 82: 909, 911-912 (1997)), Group IV semiconductors (for example diamond and α-San), I-VII semiconductors (for example CuF, CuCl, CuBr, CuI, AgBr, and AgI), Group II-VI semiconductors (for example BeO, BeS, BeSe, BeTe, BePo, MgTe, ZnO, ZnS, ZnSe, ZnTe, ZnPo, CdS, CdSe, CdTe, CdPo, HgS, HgSe, and HgTe), Group III-V semiconductors (for example BN, BP, BAs, AlN, AlP, AlAs, AlSb, GaN, GaP, GaSb, InN, IAs, InSb), Sphaelerite Structure Semiconductors (for example MnS, MnSe, β-SiC, $Ga_2Te_3$, $In_2Te_3$, $MgGeP_2$, $ZnSnP_2$, and $ZnSnAs_2$), Wurtzite Structure Compounds (for example NaS, MnSe, SiC, MnTe, $Al_2S_3$, and $Al_2Se_3$), I-II'-$VI_2$ semiconductors (for example $CuAlS_2$, $CuAlSe_2$, $CuAlTe_2$, $CuGaS_2$, $CuGaSe_2$, $CuGaTe_2$, $CuInS_2$, $CuInSe_2$, $CuInTe_2$, $CuTlS_2$, $CuTlSe_2$, $CuFeS_2$, $CuFeSe_2$, $CuLaS_2$, $AgAS_2$, $AgAlSe_2$, $AgAlTe_2$, $AgGaS_2$, $AgGaSe_2$, $AgGaTe_2$, $AgInS_2$, $AgInSe_2$, $AginTe_2$, $AgFeS_2$), and $Al_2O_3$. Other conducting or semiconducting materials, such as metals and semimetals, which absorb light and are capable of transmitting the light energy to an analyte to ionize it are within the scope of the invention as well.

In another exemplary embodiment, the sample 8 is desorbed from the sample zone 6 by applying radiation directly to the sample. Typically, the radiation is light radiation, such as a laser radiation. Typically, the radiation desorbs the sample from the sample zone and ionizes the sample thereby producing a desorbed ion sample 9. For examples of direct desorption ionization see: Zenobi et al., *Chimia* 51: 801-803 (1997); Zhan, et al., *J. Am. Soc. Mass Spec.* 8: 525-531 (1997); Hrubowchak et al., *Anal. Chem.* 63: 1947-1953 (1991); Varakin et al., *High Energy Chemistry* 28: 406-411 (1994); Wang et al., *Appl. Surf. Sci.* 93: 205-210 (1996); and Posthumus et al., *Anal. Chem.* 50: 985-991 (1978).

In another exemplary embodiment, the sample is desorbed using a particle bombardment technique. Particle bombardment techniques use a particle beam directed to the sample zone to desorb the sample. The sample is desorbed in the form of ions, fragments, or a combination thereof. In one embodiment, a fast atom bombardment technique is used to desorb the sample. In the FAB embodiment, a fast atom beam (e.g. 6 keV xenon atoms) is directed to a liquid matrix in which the sample is dissolved. Useful liquid matrices include glycerol, thioglycerol, m-nitrobenzyl alcohol, or diethanolamine. In another embodiment, an ion beam (e.g. cesium ions) is used to desorb the sample and produce a desorbed ion sample.

In another exemplary embodiment, the sample is desorbed using a field desorption technique. Typically, the sample zone comprises an emitter on which the sample is deposited. A current is passed through the emitter and the sample is desorbed by evaporation into the gas phase to form a gas phase desorbed sample. The gas phase desorbed sample is typically ionized using a field ionization technique. An electric field at the tip of the emitter allows ionization of the gas phase desorbed sample by electron tunneling. Emitters useful in the current invention include carbon emitters and silicon emitters.

In another exemplary embodiment, the sample is thermally desorbed from the sample zone to produce a gas phase desorbed sample. The gas phase desorbed sample is then ionized. Useful methods of ionizing a gas phase desorbed sample include electron ionization, chemical ionization, desorption chemical ionization and negative-ion chemical ionization.

In another exemplary embodiment, the sample is thermally desorbed from the sample zone to produce a solution phase desorbed sample. The solution phase desorbed sample is then ionized. Useful method of ionizing a liquid sample include electrospray ionization and atmospheric pressure chemical ionization.

In another exemplary embodiment, electrospray ionization is performed upon a liquid sample wherein the liquid sample is desorbed from the sample zone with a liquid force. Typically, the liquid force is a solvent flowing through a pillar channel located in the pillar. The solvent flows from the pillar toward the sample zone (for more information on channels in a pillar, see U.S. Pat. No. 6,454,924 which herein incorporated by reference in its entirety for all purposes). To ionize the sample, a voltage may be applied to the sample zone. Elevating the sample zone with respect to the chip base provides an advantage in performing electrospray ionization.

Elevated sample zones of the present invention provide a number of advantages over non-elevated sample zones. For example, elevated sample zones provide increased sample concentrations. Mass spectrometric techniques, such as MALDI mass spectrometry, require high concentrations of sample in order to obtain accurate results. Application of a liquid sample to a non-elevated sample zone results in a diffuse pool because there is no barrier to prevent the liquid from dispersing. By contrast, an elevated sample zone provides a coherent volume physically separated from the base by the pillar. Thus, the elevated sample zone prevents dispersion of the sample resulting in higher concentration and improved results using mass spectrometry.

Another advantage of elevated sample zones is improved desorption and ionization. The physical separation of the elevated sample zone from the non-sample zones by the pillar results in sample droplets with higher surface tension. The high surface tension is desirable in forming a Taylor cone. A Taylor cone forms when an accumulation of charge causes destabilization of the liquid surface to a point where the mutual repulsion between charged species overcomes the surface tension (the Rayleigh limit), thereby forming solvent-free ions. Thus, by improving Taylor cone formation, the elevated sample zone provides improved desorption and ionization.

Elevation of the sample zone also provides a greater degree of separation between the sample zone and the non-sample zones of the chip. The elevated sample zone provides three-dimensional separation as compared to the two-dimensional separation of non-elevated sample zones. The higher degree of separation enables facile application of radiation to the sample. In addition, the higher degree of separation decreases the receipt of radiation in non-sample zones, thus decreasing desorption of contaminating materials.

In addition, the elevated sample zone allows the electric field strength to be varied between the base and the elevated sample zone. Because a non-elevated sample zone is in the same plane as the base, the electric field strength cannot be varied between the base and sample zone. By varying the electric field strengths between the base and elevated sample zone, optimal electric field conditions are obtained resulting in improved desorption and ionization of the sample.

Detecting the Desorbed Ion Sample

The method of the present aspect also involves detecting the desorbed ion sample 11. In an exemplary embodiment, the desorbed ion sample is detected using an ion detector. Typically, the ion detector forms a part of a mass spectrometer.

Another embodiment is directed to a mass spectrometer apparatus comprising an analytical assembly, an ionization source to ionize the sample, and an ion detector for detecting an ion desorbed from the sample zone. The analytical assembly comprises a chip and a conductive element. The chip comprises a base having a surface and one or more structures protruding above the surface of the base. Each structure comprises a pillar and a sample zone. The addition, the sample zone comprises a support material. The conductive element comprises an aperture of sufficient proportion to allow passage of a molecular ion and is adapted to be at a different electrical potential than the base.

Mass spectrometers generally comprise four basic parts: a sample inlet system, an ionization source, a mass analyzer and an ion detector (see generally, Kroschwitz et al., *Encyclopedia of Chemical Technology,* 4th ed. (1995) John Wiley & Sons, New York; Siuzdak et al., Mass Spectrometry for Biotechnology, (1996) Academic Press, San Diego). Mass analyzers effect separation of ions emerging from an ion source based on the mass-to-charge ratio, m/z. A variety of mass analyzer apparatuses are useful in the current invention, including linear quadrupole (Q), time-of-flight (TOF), ion cyclotron resonance (ICR), ion traps, magnetic sector and combinations and variation thereof, including tandem mass spectrometers. A variety of ion detectors are useful in the current invention including, for example, Faraday cups, electron multipliers, photomultiplier conversion dynodes, high energy dynode detectors, array detectors, Fourier transform ion cyclotron resonance detectors, and the like.

Ionization sources are described above (see Desorption and Ionization section). Ionization sources include, for example, electron ionization, fast atom bombardment, laser desorption and electrospray.

Figure 5:
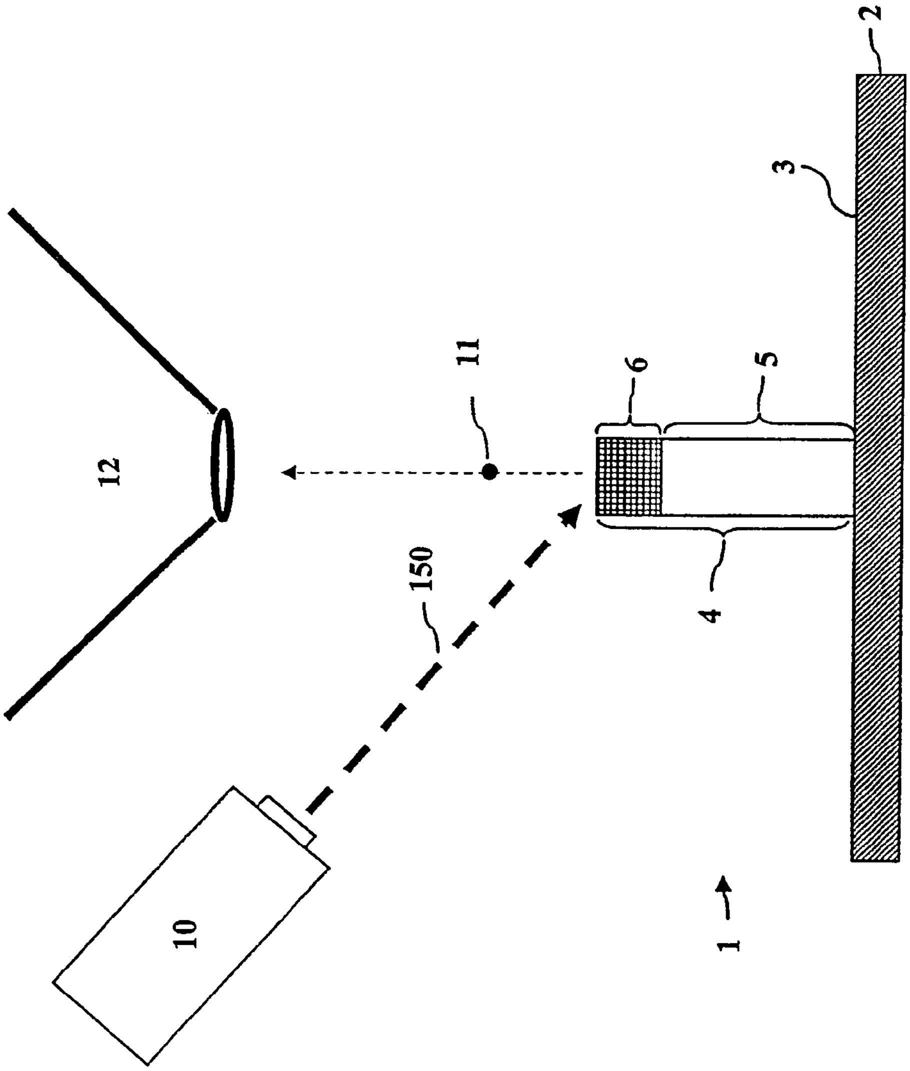
FIG. 5 illustrates an exemplary ion detection of a desorbed ion sample using a mass spectrometer.

FIG. 5 illustrates an exemplary method of detecting the desorbed ion sample 11 using a mass spectrometer. A laser source 10 directs laser radiation to the sample zone 6 thereby producing a desorbed ion sample 11. The desorbed ion sample enters the inlet of a mass spectrometer 12 that forms part of a mass spectrometer. Typically, the space within the inlet of the ion detector 12 is under a high vacuum and is, therefore, of lower pressure in relation to the space outside the inlet 12. In an exemplary embodiment, the method of desorption is MALDI and the mass analyzer it s TOF analyzer.

In an exemplary embodiment, the inlet of the ion detector 12 comprises a different electrical potential than the base.

Allowing the Desorbed Ion Sample to Pass Through an Aperture in a Conductive Element In an exemplary embodiment, the methods of the present invention comprise allowing the desorbed ion sample to pass through an aperture in a conductive element, wherein the conductive element comprises a different electrical potential than the base.

Figure 6:
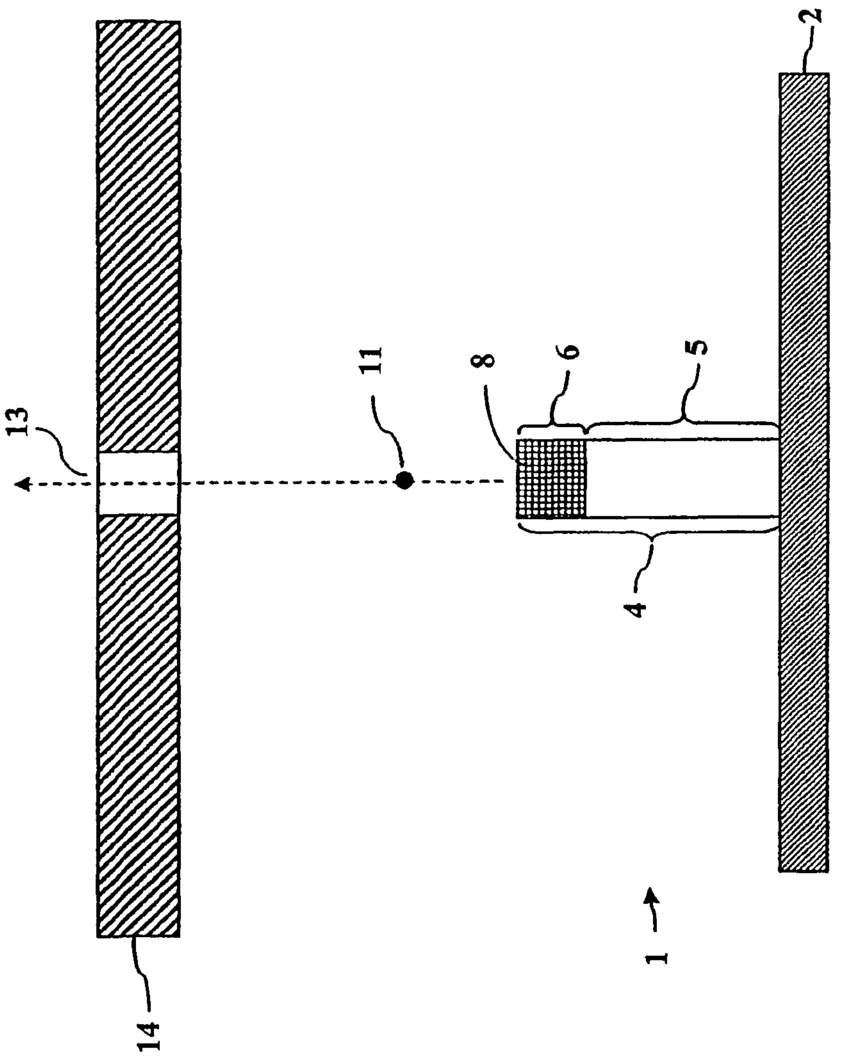
FIG. 6 illustrates an example of allowing the desorbed ion sample to pass through an aperture of a conductive element.

FIG. 6 illustrates an exemplary method comprising allowing the desorbed ion sample to pass through an aperture in a conductive element. After desorbing the sample 8 from the sample zone 6, the resulting desorbed ion sample 11 is allowed to pass through an aperture 13 in the conductive element 14. Typically, the conductive element 14 comprises a different electrical potential than the base 2. For example, the conductive element can be at a potential of 60 volts and the base 2 can be at a potential of 30,000 volts.

Elevating the sample zone with respect to the chip base provides an advantage in allowing the desorbed ion sample to pass through an aperture in a conductive element. Because the tip is closer to the plate, the sample zone is subjected to a higher electric field than with a non-elevated sample zone. The higher electric field results in more efficient passage of the ion through the aperture. In addition, isolation of specific samples may be more efficient because the elevated sample zone allows the electric filed produced by the conductive element to focus on an individual structure.

Conductive elements of the present invention comprise at least one aperture. In one embodiment, the conductive element comprises a plurality of apertures arranged in an array format. In another embodiment, the conductive element comprises a single aperture.

In another embodiment, the position of the chip is translatable, thereby allowing alignment of an aperture with a structure whereby the desorbed ion sample passes through the aperture. Thus, in an exemplary embodiment, the method comprises aligning the aperture with one of the structures whereby the desorbed ion sample passes through the aperture. Typically, the desorbed ion sample passes through the aperture before detection of the desorbed ion sample but after desorbing the sample from the chip.

In another embodiment, the conductive element is translatable, thereby allowing alignment of an aperture with a structure. In yet another embodiment, both the chip and the conductive element are translatable. Regardless of which component is translatable, the pillar 5 and the aperture 13 can be aligned with respect to each other.

Conductive elements of the present invention comprises a different electrical potential than the base. The electrical potential is typically sufficiently high to create a magnetic field of sufficient strength to shuttle the desorbed ion sample through the aperture. The conductive element comprises a material capable of conducting an electrical current such as copper, aluminum and alloys thereof. A variety of conductive materials are useful as components of a conductive element, such as conductive metals or semi-conductive silicon materials.

Conductive elements may be of any suitable geometry (e.g. rectangular, circular, octahedral etc.). The conductive element may be of any suitable height and, width. In an exemplary embodiment, the conductive element is more than 2 cm in height. In another exemplary embodiment, the conductive element is less than 20 μm in height. In an exemplary embodiment, the conductive element is more than 10 cm in width or diameter. In another embodiment, the conductive element is less than 100 μm in width or diameter.

Apertures of the present invention are of sufficient dimension to'allow passage of a desorbed ion sample. Thus, the size of the desorbed ion sample will determine the minimum diameter of the aperture. In an exemplary embodiment, the aperture is from about 5 angstroms to about 50 angstroms in diameter. In another embodiment, the aperture is from about 50 angstroms to about 500 angstroms in diameter. In another embodiment, the aperture is from about 50 nm to about 500 nm in diameter. In another embodiment, the aperture is from about 500 nm to about 1000 nm in diameter. In another embodiment, the aperture is from about 1 μm to about 50 μm in diameter. In another embodiment, the aperture is from about 50 μm to about 500 μm in diameter. In another embodiment, the aperture is from about 500 μm to about 1000 μm in diameter. In another embodiment, the aperture is from about 1 to 1000 mm. In another embodiment, the aperture is from about 1 to 5 cm.

In another embodiment the laser source is directed to the sample zone through the aperture. Typically, the laser is a pulsed laser and is timed so as not to disrupt the desorbed ion samples from passing through the aperture.

Figure 7:
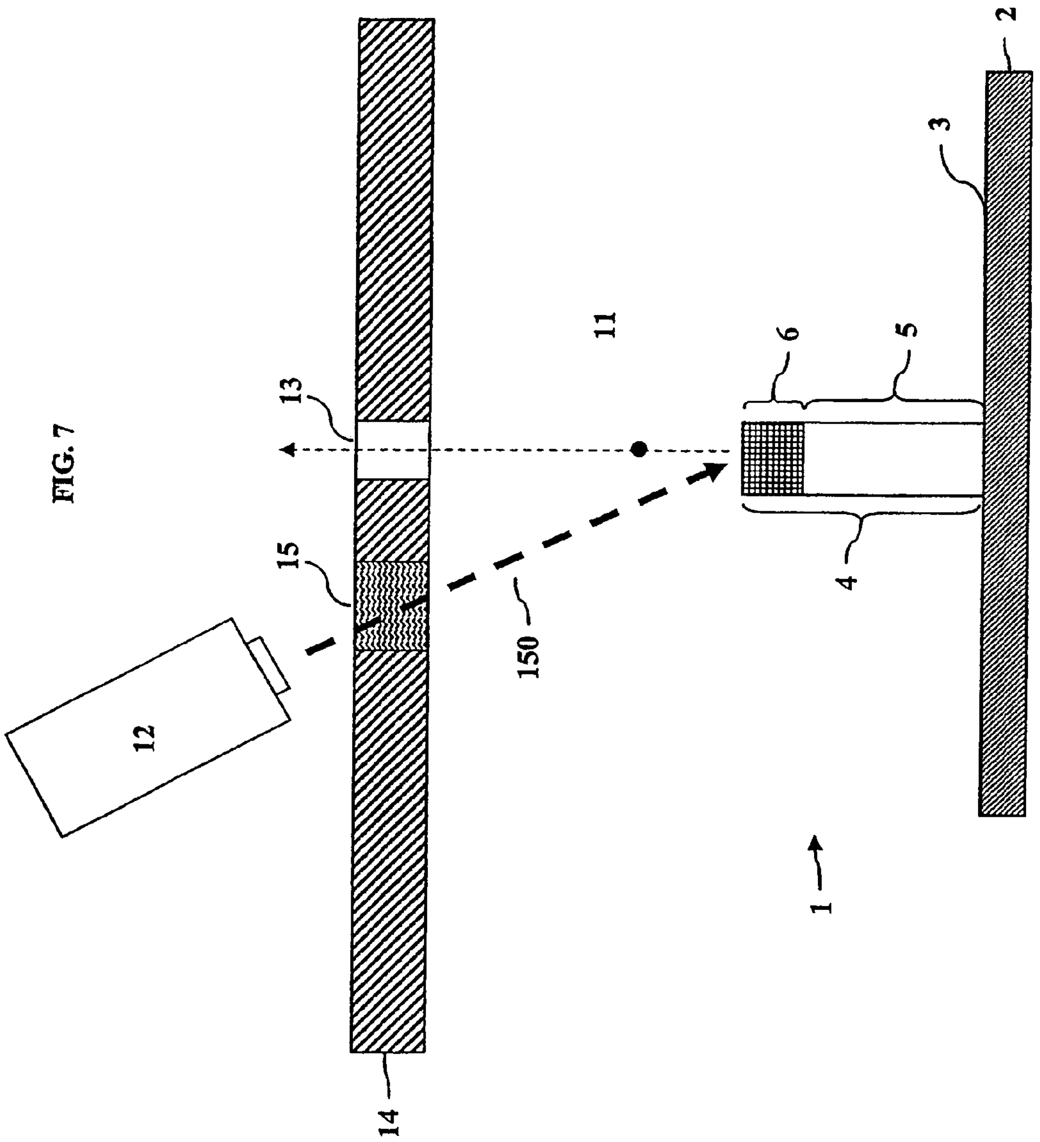
FIG. 7 illustrates an exemplary passing of a laser through a conductive element.

In another embodiment, the laser radiation is directed to the sample zone through a window 15 in the conductive element 14 through an (see FIG. 7). The window 16 is typically an aperture or a non-light absorbing material such as glass or silicon-based material. The non-light absorbing material is typically inserted into the conductive element after forming a hole into which the material is inserted. The window can be of any size suitable for allowing laser radiation to pass.

Any one or more features of any embodiment of using the chip, desorbing and ionizing the sample, detecting the desorbed ion sample, or allowing the desorbed ion sample to pass through an aperture in a conductive element described above can be adapted or incorporated into an assembly or apparatus.

For example, in one embodiment, the present invention provides an analytical assembly comprising a chip and a conductive element. The chip comprises a base having a surface and one or more structures protruding above the surface of the base. Each structure comprises a pillar and a sample zone. In addition, the sample zone comprises a support material. The conductive element comprises an aperture of sufficient proportion to allow passage of a molecular ion and is adapted to be at a different electrical potential than the base. The pillar, base, aperture, sample zone, support, aperture and all other elements of the assembly comprise the same properties, parameters and characteristics as described in the above embodiments.

The Sample

A variety of samples are analyzed using the methods of the current invention. Samples comprise biological materials derived from a bodily, cellular, viral and/or prion source. Some samples are derived from biological fluids such as blood and urine. In some embodiments, the biological fluids include whole cells, cellular organelles or cellular molecules such as a protein, protein fragment, peptide, carbohydrate or nucleic acid. The biological material can be endogenous or non-endogenous to the source. For example, in one embodiment, the biological material is a recombinant protein harvested from a bacteria and engineered using molecular cloning techniques (see generally, Sambrook et al., *Molecular Cloning: A Laboratory Manual,* 2d ed. (1989) Cold Spring Harbor Laboratory Press, Cold Spring Harbor, N.Y., which is incorporated herein by reference). In another embodiment, the sample comprises a chemically synthesized biological material such as a synthetic protein, protein fragment, peptide, carbohydrate or nucleic acid.

In some embodiments, the samples are in the form of liquids when they contact the sample zone. When liquid samples are on the sample zone, the liquid samples may be in the form of discrete deposits. Any suitable volume of liquid may be deposited on the sample zone. For example, the liquid samples that are deposited on the sample zones may be on the order of about 1 microliter or less. In other embodiments, the liquid samples on the sample zones may be on the order of about 10 nanoliters or less (e.g., 100 picoliters or less).

In yet other embodiments, liquid media need not be retained in the sample zones after liquid from a dispenser contacts the sample zone.

In another exemplary embodiment, the biological material sample may be processed in the sample zone by contacting the sample with a processing reagent. Processing reagents typically function to prevent the analytes in the sample zone from refolding, enhance the mass spectrometric response, improve the mass spectrometric fragmentation, label the samples to improve the mass spectrometric selectivity, cleave the sample, unfold the sample, and/or derivatize the sample.

In another embodiment, the processing reagent can separate a sample that has been covalently or noncovalently immobilized to the sample zone. For example, where a disulfide bond immobilizes the sample to the sample zone, the processing agent is a reducing agent (such a dithiothreitol) that disrupts the disulfide linkage and separates the sample from the sample zone. In another embodiment, the processing reagent can separate a sample from a binding reagent (see below). For example, where an antibody binding reagent immobilizes a sample to the sample zone, a denaturant (such as guanidinium hydrochloride) function to disrupt the non-covalent bonds and separate the sample from the sample zone.

Binding Reagents

Figure 8A:
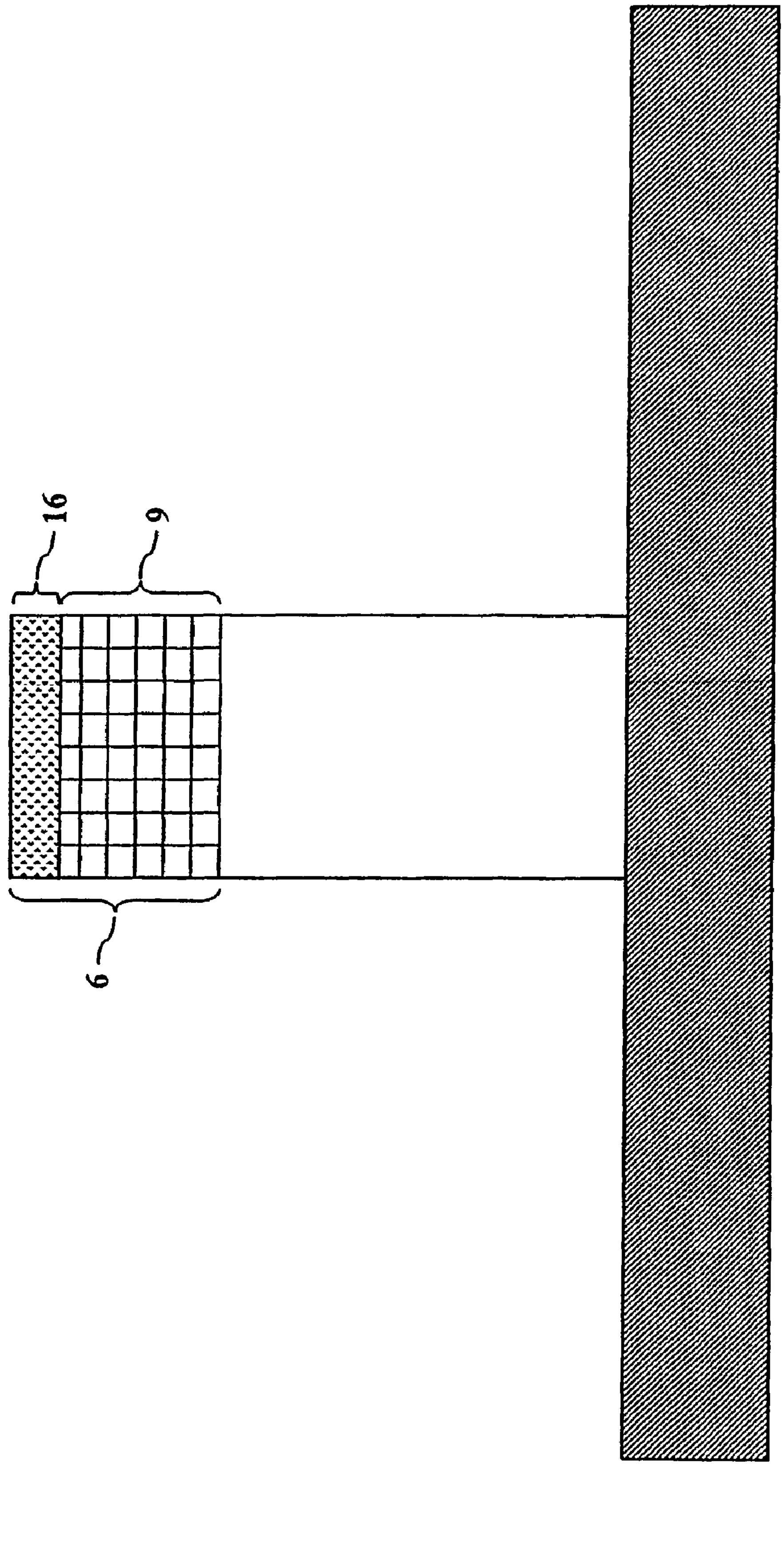
FIG. 8(*a*)-(*b*) shows exemplary surface coatings that coat the support material.
Figure 8B:
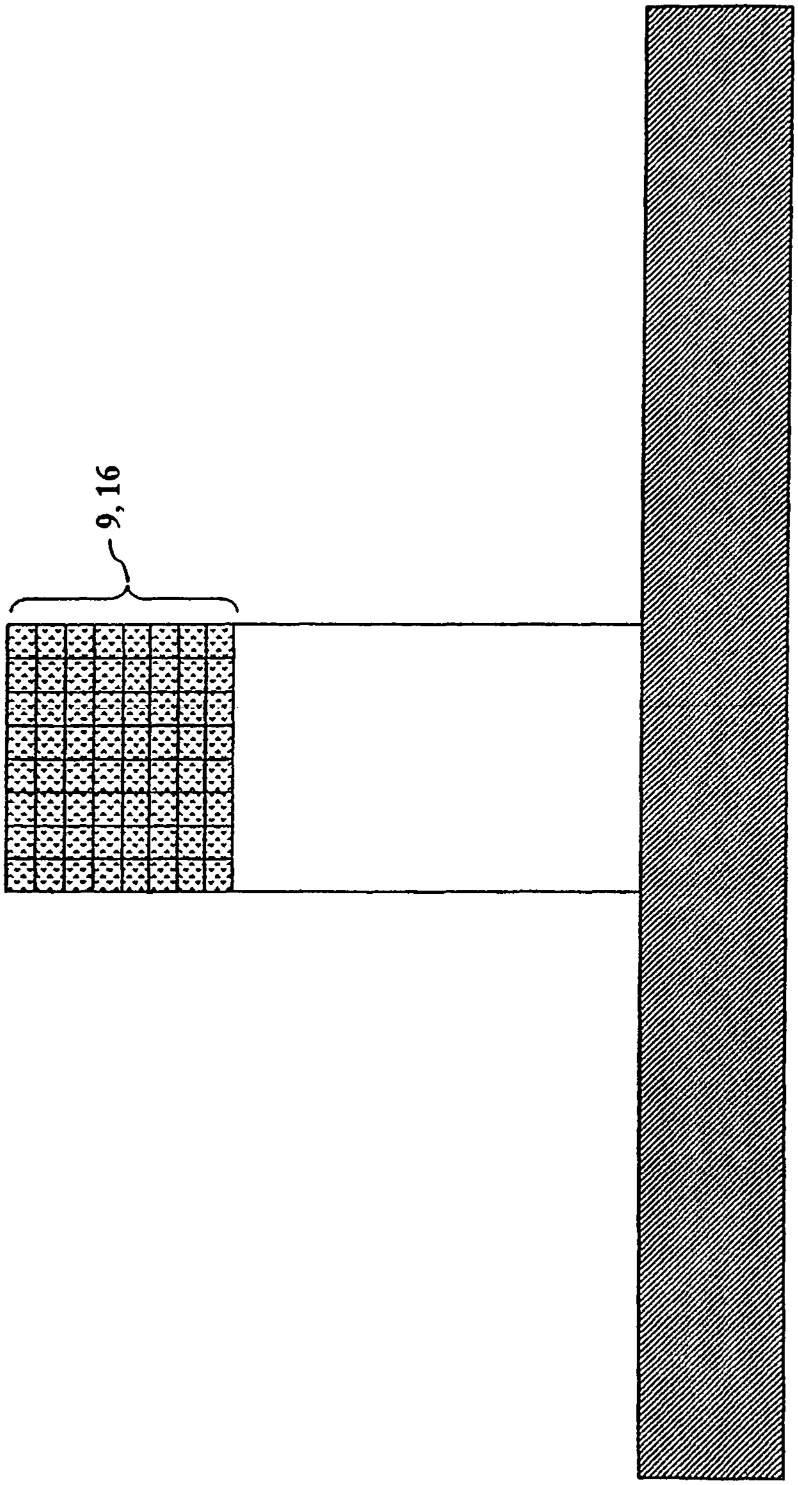

In an exemplary embodiment, the sample zone 6 comprises a surface coating comprising a binding reagent, wherein the binding reagent interacts with the sample. In one embodiment, the surface coating 16 coats all (see FIG. 8(*a*)) or a portion of the support material 9. In another embodiment, the surface coating coats a layer within the surface zone that does not contain the support material. (see FIG. 8(*b*)). The layer typically is positioned above the support material at the top of the sample zone.

In an exemplary embodiment, binding reagent of the present invention are covalently bound to the support material. The binding reagent may be covalently bound using a variety of covalent chemical linkages known. Useful covalent linkages may be found, for example, in texts relating to the art of solid phase synthesis of biomolecules such as peptides and nucleic acids (see, e.g., Eckstein et al., *Oligonucleotides and Analogues: A Practical Approach*, (1991); Stewart et al., *Solid Phase Peptide Synthesis,* 2nd Ed., (1984))

In another embodiment, the binding reagent is non-covalently bound to the support material. A variety of methods of non-covalently binding are useful in the present invention and include, for example, methods based on ionic interactions, hydrogen bonding, hydrophobic interactions, hydrophilic interactions and hydrogen bonding interactions.

In an exemplary embodiment, the interaction between the binding reagent and the sample is a specific binding event. In a specific binding event, the binding reagent has a high affinity to a specific element of the sample. In an exemplary embodiment, the sample comprises a protein and the binding reagent is an antibody molecule that has a high affinity to a specific site of the protein. In another exemplary embodiment, the sample comprises a nucleic acid and the binding reagent is a nucleic acid capable of specifically hybridizing with the sample nucleic acid. In another exemplary embodiment, the sample comprises a nucleic acid binding protein and the binding reagent comprises a nucleic acid capable of specifically binding to the nucleic acid binding protein.

Binding reagents function to bind the sample to the sample zone. The binding reagent may bind to the sample zone and substantially all of the liquid medium may be removed from the sample zone, leaving only the capture agent at the sample zone. A variety of binding reagents are capable of binding the samples of the invention to the sample zone.

Suitable binding reagents may be organic or inorganic in nature, and may be biological molecules such as proteins, polypeptides, DNA, RNA, mRNA, antibodies, antigens, etc. Other suitable analytes may be chemical compounds that may be potential candidate drugs. Reactants may include reagents that can react with other components on the sample zones. Suitable reagents may include biological or chemical entities that can process components at the sample zones. For instance, a reagent may be an enzyme or other substance that can unfold, cleave, or derivatize the proteins at the sample zone. Suitable liquid media include solutions such as buffers (e.g., acidic, neutral, basic), water, organic solvents, etc. Binding reagents are well known in the art and include, but are not limited to, glutathione-S-transferase (GST), maltose-binding domain, chitinase (e.g. chitin binding domain), cellulase (cellulose binding domain), thioredoxin, protein G, protein A, T7 tag, S tag, Histidine-6, protein kinase inhibitor, HA, c-Myc, trx, Hsc, Dsb, and the like.

In another exemplary embodiment, the surface coating is a thin film comprising a binding reagent wherein the binding reagent comprises an organic molecule. The thin film is typically less than about 20 nanometers thick. Preferably, the organic thin film is in the form of a monolayer. A "monolayer" is a layer of molecules that is one molecule thick. In some embodiments, the molecules in the monolayer may be oriented perpendicular, or at an angle with respect to the surface to which the molecules are bound. The monolayer may resemble a "carpet" of molecules. The molecules in the monolayer may be relatively densely packed so that proteins that are above the monolayer do not contact the layer underneath the monolayer. Packing the molecules together in a monolayer decreases the likelihood that proteins above the monolayer will pass through the monolayer and contact a solid surface of the sample structure.

In another embodiment, the binding reagent comprises an affinity tag. An affinity tag is a functional moiety capable of directly or indirectly immobilizing a component such as a protein. The affinity tag may include a polypeptide that has a functional group that reacts with another functional group on a molecule in the organic thin film. Suitable affinity tags include avidin and streptavidin.

In another embodiment, the surface coating further comprises an "adaptor" that directly or indirectly links a binding reagent to a pillar. In some embodiments, an adaptor may provide an indirect or direct link between an affinity tag and a capture agent.

Other examples of surface coatings and binding reagents are described in U.S. patent application Ser. Nos. 09/115,455, 09/353,215, and 09/353,555, and U.S. Pat. No. 6,454,924, which are herein incorporated by reference in their entirety for all purposes, and are assigned to the same assignee as the present application. These U.S. patent applications describe various layered structures that can be on the pillars in embodiments of the invention.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention. For example, any feature of the methods of analyzing a sample described above can be incorporated into any of the assemblies, chips, or systems without departing from the scope of the invention.

In addition, the patents and scientific references cited herein are incorporated by reference in their entirety.

What is claimed is:

1. A method comprising:

(a) desorbing a sample from a chip to produce a desorbed ion sample, wherein the chip comprises:

i. a base having a surface, and ii. one or more structures protruding above the surface of the base, each structure comprising a pillar and a sample zone, wherein the sample zone comprises a support material and the sample;

(b) detecting the desorbed ion sample with an ion detector, wherein the desorbed ion sample from step (a) is detected by the ion detector in step (b) without passing through any fluid transporting device.

2. The method of claim 1 further comprising allowing the desorbed ion sample to pass through an aperture in a conductive element, wherein the conductive element comprises a different electrical potential than the base.

3. The method of claim 2, wherein the position of the chip is translatable, wherein the method further comprises aligning the aperture with one of the structures whereby the desorbed ion sample passes through the aperture after (a) but before (b).

4. The method of claim 2, further comprising directing radiation at the sample zone before (a) through a window in the conductive element.

5. The method of claim 1, wherein said support material receives radiation.

6. The method of claim 1, wherein each pillar and the base comprise the support material that receives radiation.

7. The method of claim 1, wherein said support material is porous.

8. The method of claim 1, wherein said support material is conducting or semiconducting.

9. The method of claim 1, wherein said support material is capable of transferring energy to the sample after receiving radiation.

10. The method of claim 1, wherein the support material is coated with a surface coating comprising a binding reagent, wherein the binding reagent interacts with the sample.

11. The method of claim 10, wherein the interaction between the binding reagent and the sample is a specific binding event.

12. The method of claim 1, wherein the pillar and sample zone are identical in chemical composition.

13. The method of claim 1, further comprising directing radiation at the sample zone before (a).

14. The method of claim 1, wherein the ion detector forms part of a mass spectrometer.

* * * * *